US009399587B2

United States Patent
Sastri et al.

(10) Patent No.: US 9,399,587 B2
(45) Date of Patent: Jul. 26, 2016

(54) SYSTEM AND METHOD FOR SLURRY PREPARATION

(71) Applicant: General Electric Company, Schenectady, NY (US)

(72) Inventors: Annavarapu Vijay Bharat Sastri, Bangalore (IN); Sharat Sheshachar Katti, Bangalore (IN)

(73) Assignee: General Electric Company, Schenectady, NY (US)

( * ) Notice: Subject to any disclaimer, the term of this patent is extended or adjusted under 35 U.S.C. 154(b) by 192 days.

(21) Appl. No.: 14/173,440

(22) Filed: Feb. 5, 2014

(65) Prior Publication Data

US 2015/0218469 A1 Aug. 6, 2015

(51) Int. Cl.
*C02F 1/06* (2006.01)
*C10J 3/50* (2006.01)
*C10J 3/72* (2006.01)
*C02F 103/00* (2006.01)

(52) U.S. Cl.
CPC . *C02F 1/06* (2013.01); *C10J 3/506* (2013.01); *C10J 3/723* (2013.01); C02F 2103/005 (2013.01); C02F 2209/005 (2013.01); C02F 2209/006 (2013.01); C10J 2300/0903 (2013.01); C10J 2300/0973 (2013.01); C10J 2300/169 (2013.01); C10J 2300/1807 (2013.01); Y02E 20/18 (2013.01)

(58) Field of Classification Search
CPC .................. C02F 1/06; C02F 2103/005; C02F 2209/005; C02F 2209/006; C10J 2300/0903; C10J 2300/0973; C10J 2300/1807; C10J 2300/169
See application file for complete search history.

(56) References Cited

U.S. PATENT DOCUMENTS

| 4,624,684 | A |   | 11/1986 | Stevenson |
| 5,415,673 | A | * | 5/1995  | Hilton ........................ C01B 3/32 |
|           |   |   |         | 252/373 |
| 2006/0089519 | A1 | | 4/2006 | Stell et al. |
| 2009/0107046 | A1 | | 4/2009 | Leininger et al. |

(Continued)

FOREIGN PATENT DOCUMENTS

WO         9855195 A1  12/1998
WO      2013026176 A1   2/2013

OTHER PUBLICATIONS

Definition of "conduit" from thefreedictionary.com (obtained Mar. 2016).*
Siemens AG, "The SIMATIC PCS 7 Process Control System Totally Integrated Automation", Apr. 30, 2008.

(Continued)

*Primary Examiner* — Lucas Stelling
(74) *Attorney, Agent, or Firm* — Fletcher Yoder, P.C.

(57) ABSTRACT

A system includes a gasifier configured to gasify a fuel contained within a fuel slurry in order to generate syngas and a black water. The fuel slurry includes at least the fuel and water. The system also includes a black water treatment system fluidly coupled to the gasifier. The black water treatment system is configured to treat the black water to generate a grey water. The black water treatment system includes a first flash tank configured to process the black water by reducing a pressure of the black water to generate a first discharged black water. The black water treatment system also includes a first flow path fluidly coupling a first discharged black water outlet of the first flash tank with a feedstock preparation system configured to generate the fuel slurry in order to provide at least a first portion of the first discharged black water of the first flash tank to the feedstock preparation system.

20 Claims, 4 Drawing Sheets

(56) References Cited

U.S. PATENT DOCUMENTS

| | | |
|---|---|---|
| 2009/0178338 A1 | 7/2009 | Leininger et al. |
| 2010/0254871 A1* | 10/2010 | Foster .................... C02F 11/06 423/235 |
| 2011/0108405 A1 | 5/2011 | Bommareddy et al. |
| 2011/0209407 A1 | 9/2011 | Arya et al. |
| 2012/0198768 A1 | 8/2012 | Khosravian et al. |
| 2013/0045143 A1 | 2/2013 | Steele et al. |
| 2013/0183204 A1 | 7/2013 | Benipal et al. |

OTHER PUBLICATIONS

International Search Report and Written Opinion issued in connection with corresponding PCT Application No. PCT/US2015/012561 dated Sep. 9, 2015.

PCT Search Report and Written Opinion issued in connection with corresponding PCT Application No. PCT/US2015/012561 on Apr. 8, 2015.

Unpublished U.S. Appl. No. 13/837,588, filed Mar. 15, 2013, "Systems and Methods for Slurry Preheating".

* cited by examiner

SYSTEM AND METHOD FOR SLURRY PREPARATION

BACKGROUND

The subject matter disclosed herein relates to the preparation of fuel slurries used in gasification processes, and more specifically to increasing the temperature of fuel slurries.

Synthesis gas or "syngas" is a mixture of carbon monoxide (CO) and hydrogen ($H_2$), and may also be associated with other components, such as carbon dioxide ($CO_2$), methane ($CH_4$), hydrogen sulfide ($H_2S$), water ($H_2O$), and others. Syngas has a number of uses, such as in power generation, steam generation, heat generation, substitute natural gas (SNG) production, as well as chemical synthesis. Syngas can be produced using gasification processes, which utilize a solid, liquid, and/or gaseous carbonaceous fuel source such as coal, coke, oil, and/or biomass, and/or natural gas to react with oxygen ($O_2$) to produce the syngas within a gasifier. While certain liquid and gaseous carbonaceous fuels may be provided to the gasifier directly, solid carbonaceous fuel sources are often provided to the gasifier as a fuel slurry, where the solid fuel is dispersed within a liquid, such as water. The liquid is used to facilitate flow of the solid fuel into the gasifier as well as to facilitate dispersal of the solid fuel within the gasifier, for example to increase gasification efficiency.

BRIEF DESCRIPTION

Certain embodiments commensurate in scope with the present disclosure are summarized below. These embodiments are not intended to limit the scope of the claims, but rather these embodiments are intended only to provide a brief summary of certain embodiments. Indeed, embodiments of the present disclosure may encompass a variety of forms that may be similar to or different from the embodiments set forth below.

In a first embodiment, a system includes a gasifier configured to gasify a fuel contained within a fuel slurry in order to generate syngas and a black water. The fuel slurry includes at least the fuel and water. The system also includes a black water treatment system fluidly coupled to the gasifier. The black water treatment system is configured to treat the black water to generate a grey water. The black water treatment system includes a first flash tank configured to process the black water by reducing a pressure of the black water to generate a first discharged black water. The black water treatment system also includes a first flow path fluidly coupling a first discharged black water outlet of the first flash tank with a feedstock preparation system configured to generate the fuel slurry in order to provide at least a first portion of the first discharged black water of the first flash tank to the feedstock preparation system.

In a second embodiment, a method includes providing a discharged black water to a feedstock preparation system from at least one flash tank of a black water processing system. The method also includes generating a fuel slurry using at least the discharged black water and a solid fuel.

In a third embodiment, a system includes a controller including one or more tangible, non-transitory, machine-readable media collectively storing one or more sets of instructions. The controller also includes one or more processing devices configured to execute the one or more sets of instructions to control a flow of a discharged black water from at least one flash tank of a black water processing system and to a feedstock preparation system of a gasification system, and to control the operation of the feedstock preparation system to receive at least the discharged black water and a solid fuel to generate a fuel slurry.

BRIEF DESCRIPTION OF THE DRAWINGS

These and other features, aspects, and advantages of the present disclosure will be better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As noted above, some gasification systems use a slurry of solid fuel and a liquid (e.g., water) to deliver the solid fuel to a gasifier to produce syngas. The liquid of the fuel slurry may facilitate the flow of the solid fuel to the gasifier and also aid in dispersing the solid fuel within the gasifier to increase gasification efficiency. Syngas may then be produced using a gasification process, which utilize the fuel slurry to react with oxygen ($O_2$) at elevated temperature and pressure within a gasifier. However, the oxygen consumption in the gasification process depends on, among other variables, the temperature of the fuel slurry when the fuel slurry is delivered into the gasifier. For example, low fuel slurry temperature (e.g., at or below an ambient temperature) may increase the oxygen consumption in the gasification process. Moreover, the fuel slurry may be agitated (e.g., by impellers in a slurry preparation tank) to promote mixing of the solid fuel and the liquid (e.g., water), and both the power requirement and the mixing efficiency depends on, among other variables, the temperature of the fuel slurry. For example, a fuel slurry with a lower temperature may have a higher viscosity, which may increase the power requirement for agitation and may decrease the mixing efficiency.

The present disclosure provides a fuel slurry preparation system for preparing a high temperature fuel slurry using heated water (e.g., water or steam above the ambient temperature) generated within the gasification system in a gasification plant. In some embodiments, a portion of bottoms water discharged from a high pressure flash tank in a black water treatment system may be used as an additive to mix with a solid fuel for fuel slurry preparation. In certain embodiments, a portion of bottoms water discharged from one or more flash tanks (e.g., a high pressure flash tank, a medium pressure flash tank, a low pressure flash tank, etc.) may be used as water additive to mix with a solid fuel for fuel slurry preparation. Delivering a high temperature fuel slurry to the gasifier may decrease the oxygen consumption in the gasification reaction, thereby reducing production cost of the syngas. Additionally, using heated water for fuel slurry preparation may decrease the viscosity of the fuel slurry, thereby promoting the efficiency of the mixing of the solid fuel and the liquid and reducing the power requirement for agitation within the slurry preparation tank. Moreover, using the water that is already present in the gasification system as the additive for mixing with the solid fuel may further reduce the production cost of the syngas.

Figure 1:
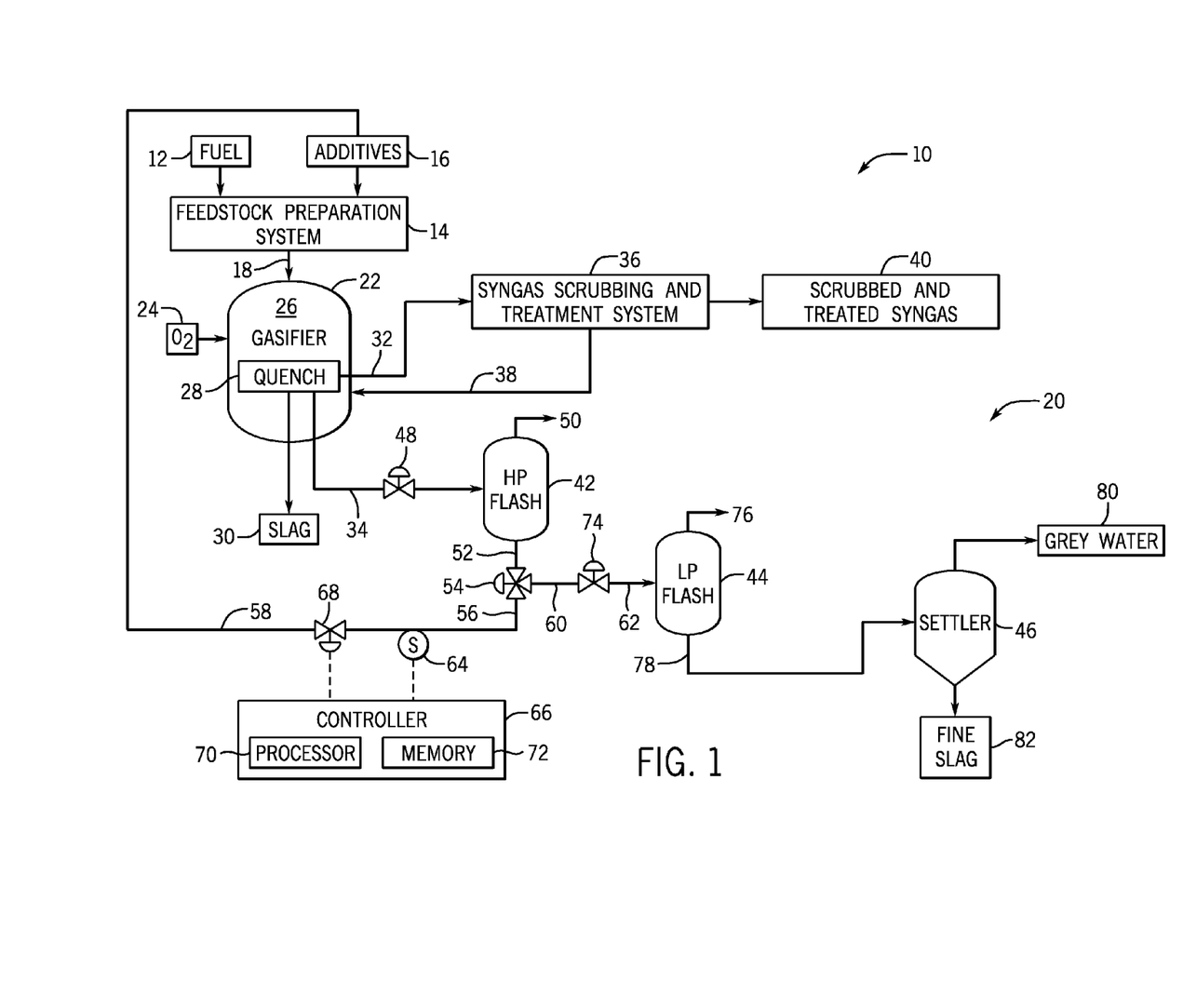
FIG. 1 is a diagrammatical illustration of an embodiment of a gasification system configured to produce syngas and to process black water, the system including a high pressure flash tank configured to reduce a pressure of the black water and discharge part of its bottoms water as an additive to mix with a solid fuel in preparing a fuel slurry for the gasification system.

The present embodiments may be used in conjunction with any gasification system that processes black water. For example, the present embodiments may be used in IGCC systems, syngas production systems, and methanation systems. With that in mind, FIG. 1 illustrates an embodiment of a gasification system 10. Within the gasification system 10, a carbonaceous fuel source 12 may be utilized as a source of energy to produce syngas. The fuel source 12 may include, but is not limited to, coal, petroleum coke, biomass, wood-based materials, agricultural wastes, tars, and asphalt, natural gas, or other carbon containing materials.

The fuel source 12 may be introduced into the gasification system 10 via a feedstock preparation system 14. The feedstock preparation system 14 may resize or reshape, select, and/or dry the fuel source 12. According to certain embodiments, the feedstock preparation system 14 may include a grinding mill. Further, within the feedstock preparation system 14, additives 16, such as water, other suitable liquids, or fluxants may be added to the fuel source 12 to create a fuel slurry 18 as a gasifier feed. In accordance with the present embodiments, heated water from a black water treatment system 20 may be used as at least one of the additives 16 for preparing the fuel slurry 18 in the feedstock preparation system 14, as discussed in greater detail below. The additive 16 may, additionally or alternatively, include any other source of hot water, for example condensate from a shift section of a syngas treatment unit (e.g., an acid gas removal unit) or boiler feed water integrated with or independent of the gasification system 10.

The fuel slurry 18 is directed to a gasifier 22 where the fuel slurry 18 is mixed with oxygen ($O_2$) 24 to produce syngas via a series of reactions, collectively referred to as a gasification process. In particular, during the gasification process the fuel slurry 18 may be reacted with a limited amount of oxygen at elevated pressures (e.g., from absolute pressures of approximately 20 bar to 85 bar) and temperatures (e.g., approximately 700° C. to 1600° C.) to partially oxidize the fuel slurry 18 and produce syngas. Due to chemical reactions between the oxygen 24, the carbon, and the water within the fuel slurry 18, the syngas may include hydrogen, carbon monoxide, and carbon dioxide. Other components may also be formed, including products from ash produced during gasification, sulfur, nitrogen, and chloride.

The gasifier 22, shown in FIG. 1, includes a reaction portion 26 where the gasification process is performed, and a quench portion 28 where the syngas produced by the gasification process is cooled. In some embodiments, the gasifier 22 may include the quench portion 28. In such embodiments, the gasifier 22 may also be referred to as a quench gasifier. Within the reaction portion 26, the fuel slurry 18 may be heated to undergo various processes, including pyrolysis, limited combustion (e.g., partial oxidation), and gasification. The heating of the fuel slurry 18 during the pyrolysis process may generate a solid, e.g., char, and residue gases, e.g., carbon monoxide and hydrogen.

The partial oxidation may include introducing oxygen to the char and residue gases. The char and residue gases may react with the oxygen to form carbon dioxide and carbon monoxide, which provides heat for subsequent gasification reactions. During the gasification process, the char may react with the carbon dioxide and steam to produce carbon monoxide and hydrogen at temperatures ranging from, e.g., approximately 800° C. to 1100° C. In this way, a resultant gas is manufactured by the gasifier 22. This resultant gas may principally include carbon monoxide and hydrogen, as well as methane, carbon dioxide, water, hydrogen chloride, hydrogen fluoride, ammonia, hydrogen cyanide, and hydrogen sulfide and carbonyl sulfide (depending on the sulfur content of the feedstock). Non-gasifiable ash material and unconverted and/or incompletely converted fuel from the fuel slurry 18 may be byproducts of the process that may exist as larger particles of molten slag and smaller particles, referred to as fines or fine slag. All of these components, including the syngas and other solids, may be referred to as a generated syngas mixture.

From the reaction portion 26, the generated syngas mixture may enter the quench portion 28 of the gasifier 22, where the syngas may be cooled and saturated. The quench portion 28 may be an integral part of the gasifier 22 as shown, or the quench portion 28 may be a separate unit. The quench portion 28 may cool the generated syngas mixture to at or near a saturation temperature through evaporation of a cooling fluid, such as water, causing certain non-syngas components to solidify. In particular, the molten slag may be rapidly cooled and solidified into coarse slag particles 30 that may be collected in the bottom of the quench portion 28. However, the temperature of the slag particles 30 may still be in the range of from approximately, 300° C. to 800° C. (e.g., at a higher temperature than ambient).

In addition to producing slag 30, the quench portion 28 may produce partially cooled syngas 32 and black water 34. The black water 34 may also be referred to as gasifier blowdown. The black water 34 includes a mixture of fines, char, and water produced within the gasifier 22, and generally will be at elevated temperatures, up to the saturation temperature of the water at the pressure in the quench portion 28. The partially cooled syngas 32 may be directed to a syngas scrubbing and treatment system 36 where additional fines, char and other entrained gases, such as hydrogen chloride, may be removed. In particular, within the syngas scrubbing and treatment system 36, the fines and char may be separated from the syngas to produce another stream of black water 38 that may exit a bottom portion of the syngas scrubbing and treatment system 36 while scrubbed and treated syngas 40 may exit the syngas scrubbing and treatment system 36.

The black water 38 exiting the syngas scrubbing and treatment system 36 may be used in quench portion 28, or may be combined with the black water 34 from the quench portion 28 and be directed to the black water treatment system 20. In other embodiments, the black water 34 and the black water 38 may be provided to the black water treatment system 20 as separate streams. The black water treatment system 20 may include one or more flash tanks that subject the black water 34 and 38 to a series of pressure reductions to remove dissolved gases and concentrate the solids contained therein. Heat from the flash tanks may be recovered and used to heat other streams within the gasification system 10.

The black water treatment system 20 of FIG. 1 includes a high pressure flash tank 42, a low pressure flash tank 44, and a settler 46. Although the high and low pressure flash tanks 42, 44 are illustrated, in other embodiments, as discussed below, the gasification system 10 may include one or more additional flash tanks, such as a medium pressure flash tank, or the gasification system 10 may include the low pressure flash tank 44 (or one of the other flash tanks) as the only flash tank. The high and low pressure flash tanks 42, 44, in a general sense, may promote separation of fines through a reduction in pressure that causes the black water 34 to be partially evaporated and cooled. In the illustrated embodiment, the high and low pressure flash tanks 42, 44 subject the black water 34 to a progressively reduced pressure, thereby facilitating further removal of dissolved gases. According to certain embodiments, the dissolved gases may include syngas absorbed from quench portion 28 and/or syngas absorbed from the syngas scrubbing and treatment system 36.

During operation, the black water 34 is discharged from the quench portion 28 of the gasifier 22 and flows through a level control valve 48. The level control valve 48 may control the liquid level in high pressure flash tank 42, and consequently the amount of black water 34 flowing to the high pressure flash tank 42. Control valve 48 also may partially flash the black water 34 to produce steam in addition to any steam that may already be present in the black water 34. For example, the level control valve 48 may reduce the pressure of the black water 34 to between approximately 20.7 bar (300 pound per square inch (PSI)) and approximately 62.1 bar (900 PSI), such as between approximately 25 bar and 55 bar, 30 bar and 45 bar, or 35 bar and 40 bar. In the context of the black water treatment system 20, the high pressure flash tank 42 may be considered to be at a first pressure that is higher than the other flash tanks.

The high pressure flash tank 42 is configured to perform a first flash event on the black water 34 to produce a first overhead vapor 50. Indeed, the high pressure flash tank 42 may flash the black water 34 to a first reduced pressure, such as to between approximately 20.7 bar-gauge (barg) (approximately 300 PSI-gauge (PSIG)) and approximately 6.9 barg (approximately 100 PSIG). For example, the pressure of the black water 34 may be reduced to between approximately 20 barg and 7 barg, such as between approximately 18 barg and 9 barg, 16 barg and 11 barg, or 14 barg and 13 barg. The first overhead vapor 50 produced by the first flash event may include a mixture of syngas and hydrogen sulfide ($H_2S$). The first overhead vapor 50 may be provided to the syngas scrubbing and treatment system 36 where various gas separation and capture processes are performed.

In addition, the high pressure flash tank 42 produces a first discharged black water 52 (also referred to as high pressure flash bottoms water 52) that exits proximate a lower portion (e.g., the bottom) of the high pressure flash tank 42 via an outlet. The first discharged black water 52 may be cooler compared to the black water 34 produced at the quench portion 28 of the gasifier 22. For example, as the first overhead vapor 50 begins to evaporate away from the bulk of the black water 34, the black water within the high pressure flash tank 42 may cool. For example, the black water 34 may be between approximately 215° C. and 270° C., such as between 230° C. and 260° C., or between 240° C. and 250° C., while the first discharged black water 52 may be between approximately 150° C. and 210° C., such as between 160° C. and 200° C., or 170° C. and 190° C.

While the first discharged black water 52 may be directed to the low pressure flash tank 44 for further processing, in accordance with the present disclosure, at least a portion of the first discharged black water 52 may be directed back to the feedstock preparation system 14 where the portion of the first discharged black water 52 may be used as at least one of the additives 16 and be mixed with the solid fuel 12 to prepare the fuel slurry 18. As noted above, the first discharged black water 52 may have a higher temperature compared to an ambient temperature, and using the portion of the first discharged black water 52, instead of or in addition to water at ambient temperature (and/or any other source of hot water, such as condensate from a shift section or boiler feed water), as the additive 16 to prepare the fuel slurry 18 may decrease the oxygen consumption of the gasification process within the gasifier 22. In addition, using the portion of the first discharged black water 52, which is already present in the gasification system 10, decreases the consumption of water of the gasification system 10.

As shown in FIG. 1, the first discharged black water 52 is directed into a three-way valve 54 where the first discharged black water 52 is split into two output streams. A first output stream 56 of the first discharged black water 52 is directed along one or more flow paths (in the illustrated embodiment, a conduit 58) fluidly coupling the three-way valve 54 and the feedstock preparation system 14. The first output stream 56 of the first discharged black water 52 may be provided along the conduit 58 to the feedstock preparation system 14 (e.g., via an outlet), and may be used as the additive 16 to mix with the solid fuel 12 in the feedstock preparation system 14 to prepare for the fuel slurry 18. A second output stream 60 of the first discharged black water 52 is provided to the low pressure flash tank 44 along another set of one or more flow paths (in the illustrated embodiment, a conduit 62) fluidly coupling the three-way valve 54 and the low-pressure flash tank 44. The three-way valve 54 may be used to control the distribution of the first discharged black water 52 between the first and second output streams 56, 60, e.g., the percentages of the first and second output streams 56, 60 with respect to the first discharged black water 52. For example, the first and second output streams 56, 60 may be 50% and 50%, respectively, of the first discharged black water 52, or any other relative percentage, based on a desired or predetermined amount of heated water for producing the slurry 18.

The conduit 58 may include a sensor 64 used to monitor one or more parameters (e.g., temperature, pressure, flow rate, particles concentration, etc.) of the first output stream 56 of the first discharged black water 52. The sensor 64 may include a temperature sensor, a pressure sensor, a flow rate sensor, a bubble sensor, a moisture sensor, or any combination thereof. The sensor 64 may be located inside, adjacent to, or in flow communication with the conduit 58 to monitor parameters (e.g., temperature, pressure, flow rate, particles concentration, etc.) of the black water within the conduit 58.

A controller 66 may process sensor feedback received from the sensor 64 and may send control signals to a valve 68 (e.g., one or more valves) located on the conduit 58 based on the sensor feedback. The controller 66 may include a distributed control system (DCS) or any computer-based workstation that is fully or partially automated. For example, the controller 66 may be any device employing a general purpose or an application-specific processor 70, both of which may generally include memory circuitry 72 for storing instructions related to pressure differentials and flow rates, for example. The processor 70 may include one or more processing devices, and the memory circuitry 72 may include one or more tangible, non-transitory (i.e., not signals), machine-readable media collectively storing instructions executable by the processor 70 to perform the methods and control actions described herein.

Such machine-readable media can be any available media other than signals that can be accessed by the processor or by any general purpose or special purpose computer or other machine with a processor. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor or by any general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause the processor or any general purpose computer, special purpose computer, or special purpose processing machines to perform a certain function or group of functions. In certain embodiments, the gasification system 10 may include one or more sensors and valves at various locations of the system 10, and one or more controllers 66 coupling these sensors and valves may govern operation of the gasification system 10 including gasification, syngas cooling, syngas scrubbing and treatment, and black water treatment.

As noted above, in the black water treatment system 20, the controller 66 may process sensor feedback received from the sensor 64 and may send control signals to the valve 68 located on the conduit 58 based on the sensor feedback. For example, if the sensor feedback received from the sensor 64 indicates that more water should be flowing in the conduit 58, the controller 66 sends an output signal to the valve 68 to open it further, allowing more water to flow into the feedstock preparation system 14 via the conduit 58. Similarly, if the sensor feedback received from the sensor 64 indicates that less water should be flowing in the conduit 58, the controller 66 sends an output signal to the valve 68 to partially close it down, allowing less water to flow into the feedstock preparation system 14 via the conduit 58. In some embodiments, in addition to sending control signals to the valve 68, the controller 66 may also send control signals to the three-way valve 54 to control both valves 54, 68 simultaneously (e.g., in sequence or in parallel) to control the parameters (e.g., temperature, pressure, flow rate, particles concentration, etc.) of water in the conduit 58. Controlling the water in the conduit 58 in this way also enables a certain level of control over the composition and temperature of the fuel slurry 18. In certain embodiments, the valve 68 may be combined with the three-way valve 54, and the controller 66 may send control signals the combined valves.

It should be noted that the conduit 58, or another conduit, may couple another heated water source (e.g., condensate from a shift reactor and/or a boiler feed water source) to the feedstock preparation system 14. In such embodiments, the controller 66 may be configured to send output signals to various flow control devices (e.g., pumps, valves) in order to control the flow of the condensate and/or the feed water to the feedstock preparation system 14. Indeed, in some embodiments, the controller 16 may use any one or a combination of condensate from a shift reactor, heated boiler feed water, or bottoms discharge from any one or a combination of the flash vessels described herein in order to control a temperature, flow, pressure, or any other parameter or combination of parameters of the liquid (e.g., water) provided to the feedstock preparation system 14 in preparing the fuel slurry 18.

In the illustrated embodiment, as noted above, the second output stream 60 of the first discharged black water 52 is provided to the low pressure flash tank 44 (e.g., via an inlet of the low pressure flash tank 44) along the conduit 62 fluidly coupling the three-way valve 54 and the low pressure flash tank 44. The amount of the first discharged black water 52 that may be provided to the low pressure flash tank 44 may be at least partially controlled using a level control valve 74 disposed along the conduit 62. In addition, the level control valve 74 may also partially flash the black water in the second output stream 60 of the first discharged black water 52 to produce steam. Indeed, level control valve 74 may reduce the pressure of the first discharged black water 52 to between approximately 4.8 bar (70 PSI) and approximately 17.2 bar (250 PSI), such as between approximately 5.0 bar and 17.0 bar, 7.0 bar and 15.0 bar, or 9.0 bar and 11.0 bar. Together, the valves 68, 74 may control the flow of the first discharged black water 52 to other portions of the system 10. Other features may, additionally or alternatively, be used to control this flow (e.g., pumps, aspirators, etc.)

The low pressure flash tank 44 is configured to perform a second flash event on the second output stream 60 of the first discharged black water 52 to produce a second overhead vapor 76. The low pressure flash tank 44 has a reduced internal pressure compared to the pressure in the high pressure flash tank 42. As an example, the low pressure flash tank 44 may reduce the pressure of the second output stream 60 to between approximately 1.4 and 3.4 barg to produce the second overhead vapor 76. For example, the pressure of the second output stream 60 may be reduced to between approximately 2.2 barg and 3.1 barg, or 2.5 barg and 2.9 barg.

The low pressure flash tank 44 produces a second discharged black water 78 (also referred to as low pressure flash bottoms water 78) that exits proximate a lower portion (e.g., the bottom) of the low pressure flash tank 44 via an outlet. The flashing process in the low pressure flash tank 44 results in cooling of the second discharged black water 78. For example, the second discharged black water 78 may have a temperature between approximately 100° C. and 150° C. By further example, the temperature may be between approximately 90° C. and 140° C., 95° C. and 140° C., or 100° C. and 130° C.

The second discharged black water 78 may be provided to the settler 46 where a substantial portion of the fine slag and char within the discharge 78 may settle. This produces a grey water 80 and a concentrated fine slag and char stream 82, with the grey water 80 being sent for further purification, for use as a source of make-up water, or for use in the gasification reaction (e.g., as a quench water source for quench portion 28). The concentrated fine slag and char stream 82 may be removed from a bottom portion of the settler 46 and provided to a filter, such as a rotary filter, for further filtering and processing.

Figure 2:
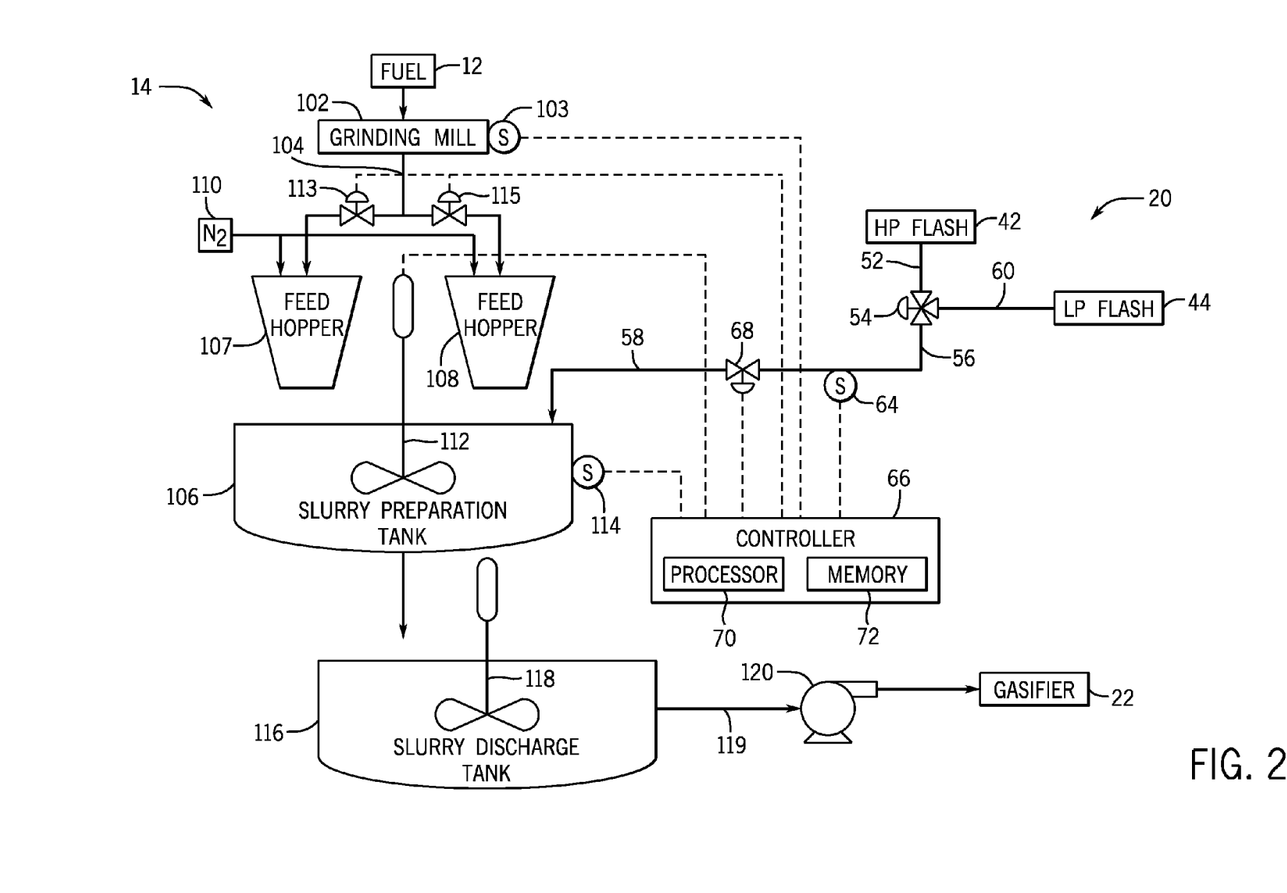
FIG. 2 is a diagrammatical illustration of an embodiment of the feedstock preparation system of FIG. 1 using the high pressure flash tank bottoms water as the additive to mix with the solid fuel in preparing a fuel slurry for the gasification system.

FIG. 2 illustrates an embodiment of the feedstock preparation system 14 of FIG. 1 using the high pressure flash tank bottoms water as at least one of the additive to be mixed with the solid fuel 12 for preparing the fuel slurry 18. As shown in FIG. 2, the feedstock preparation system 14 includes a grinding mill 102 (which can be either a dry or a wet grinding mill) configured to reduce the particle size of the solid fuel 12 to a desired particle size distribution. In some embodiments, by reducing the particle size, the solid fuel 12 may be more easily dispersed within a liquid additive (e.g., water). The grinding mill 102 may be a rod type or ball type grinding mill, or the grinding mill 102 may have similar features or combinations of features for reducing the particle size of the solid fuel 12. In certain embodiments, the grinding mill 102 may also be configured to receive other additives, such as fluxants, catalysts, and so on. In some embodiments, a sensor or a transducer (103) may be coupled to (e.g., located inside, adjacent to, or in flow communication with) the grinding mill 102 to monitor one or more parameters (e.g., amount, temperature, pressure, particles size, etc.) of the solids within the grinding mill 102. The feedback signals from the sensor or transducer 103 may be received and processed by a controller (e.g., the controller 66), and in response to the received feedback signals, the controller 66 may send signals to the grinding mill 102 to perform adjustments to the one or more parameters of the solid within the grinding mill 102.

Fine solid fuel 104 (e.g., having a smaller particle size distribution compared to the fuel 12) exiting the grinding mill 102 may be delivered to a slurry preparation tank 106 via first and second feed hoppers 107, 108 of the feedstock preparation system 14. While the illustrated embodiment includes the two feed hoppers 107, 108, any number of feed hoppers may be used as appropriate. For example, in certain embodiments, the feedstock preparation system 14 may include only one feed hopper 107 or 108, or more than two feed hoppers (e.g., 3, 4, 5, 6, or more). The two feed hoppers 107, 108 may operate in an alternating manner. For example, the first feed hopper 107 may deliver the fine solid fuel 104 into the slurry preparation tank 106 while the second feed hopper 108 receives the fine solid fuel 104 from the grinding mill 102. The two feed hoppers 107, 108 may also operate in a parallel manner. For example, the two feed hoppers 107, 108 may deliver or receive solid fuel particles simultaneously.

Nitrogen 110, as shown in FIG. 2, is provided to the feedstock preparation system 14 (e.g., from an air separation unit). The nitrogen 110 may facilitate delivering the fine solid fuel from the feed hoppers 107, 108 to the slurry preparation tank 106 (e.g., by pressurizing the feed hoppers 107, 108), and may also facilitate maintaining the fine solid fuel 104 in an inert atmosphere. In some embodiments, other inert gases (e.g., argon, or carbon dioxide) may be used. In certain embodiments, nitrogen and/or other inert gases used for this feeding process can be recycled and/or reused by incorporating one or more nitrogen storage features (e.g., a nitrogen storage drum) and, for example, one or more compressors.

As noted above, while water at an ambient temperature may be used as an additive to be mixed with the solid fuel, in accordance with the present disclosure, the heated water from the flash bottoms (e.g., the high, medium, or low pressure flash bottoms) may be used to mix with the solid fuel to prepare the fuel slurry 18. The resulting higher temperature fuel slurry may reduce the oxygen consumption in the gasification process because the gasification process typically occurs at elevated temperatures, and less oxygen may be consumed for bringing the fuel slurry to the elevated temperatures (which may, in certain embodiments, also involve the evaporation of the water in the slurry). As shown in FIG. 2, the first output stream 56 of the first discharged black water 52 may be provided via the conduit 58 to the slurry preparation system tank 106. Again, the first output stream 56 may be at a temperature between approximately 150° C. and 210° C., which enables the temperature of the fuel slurry within the slurry preparation tank 106 to be between, by way of non-limiting example, approximately 110° C. and 170° C., such as between 120° C. and 160° C., or 130° C. and 150° C. The pressure within the slurry preparation tank 106 may be between, by way of non-limiting example, approximately 8 bar and 12 bar, such as between 9 bar and 11 bar, or 9.5 bar and 10.5 bar.

The slurry preparation tank 106 may also include one or more features configured to agitate and suspend the fine solid fuel 104 within the water to produce the fuel slurry. In the illustrated embodiment, the slurry preparation tank 106 includes an impeller 112 having blades for mixing and agitating the fine solid fuel 104 within the water. The controller 66 may control the operation of the impeller 112, for example, adjusting a rotating speed of the blades of the impeller 112, to control a rate of mixing of the fine solid fuel 104 with the water.

The slurry preparation tank 106 may include a sensor 114 to monitor one or more parameters (e.g., temperature, pressure, solid concentration, viscosity, etc.) of the fuel slurry within the slurry preparation tank 106. The sensor 114 may include a temperature sensor, a pressure sensor, a concentration sensor, a viscosity sensor, or any combination thereof. The sensor 114 may be located inside, adjacent to, or in flow communication with the slurry preparation tank 106. The controller 66 may process sensor feedback received from the sensor 114 and may send control signals to valves 113, 115 located on the slurry preparation tank 106 based on the sensor feedback. In some embodiments, the valves 113, 115 of the slurry preparation tank 106 may be valves on the feed hoppers 107, 108 to control the delivery rate of the fine solid fuel 104. In certain embodiments, the controller 66 may process sensor feedback received from the sensor 114 and may send control signals to the valve 68 to control the parameters (e.g., temperature, pressure, flow rate, particles concentration, etc.) of the first output stream 56 of the first discharged black water 52 from the high pressure flash 42. In certain embodiments, heated water may be provided to the slurry preparation tank 106 from any one or a combination of other sources, for example condensate from a shift section of a gas treatment unit (e.g., an acid gas removal unit) integrated with or independent of the gasification system 10. In such cases, additional sensors may be coupled to these water sources to monitor one or more parameters (e.g., temperature, pressure, solid concentration, viscosity, etc.) of the heated water, and the controller 66 may process sensor feedback received from these additional sensors and may send control signals to control the supply of the heated water (e.g., via one or more valves) in order to maintain the one or more monitored parameters within a certain range (e.g., below and/or above predetermined thresholds).

After the fuel slurry has been prepared in the slurry preparation tank 106, it may be transferred into a slurry discharge tank 116, where the fuel slurry is further agitated. As shown in FIG. 2, the slurry discharge tank 116 includes an impeller 118 having blades for mixing and agitating the fuel slurry. The controller 66 may control the operation of the impeller 118, for example, by adjusting a rotating speed of the blades of the impeller 118, to control a rate of mixing of the fine solid fuel 104 with the water. The temperature of the fuel slurry within the slurry discharge tank 116 may be between, by way of non-limiting example, approximately 110° C. and 170° C., such as between 120° C. and 160° C., or 130° C. and 150° C. The pressure within the slurry discharge tank 116 may be between, by way of non-limiting example, approximately 8 bar and 12 bar, such as between 9 bar and 11 bar, or 9.5 bar and 10.5 bar.

At least a portion of the fuel slurry (e.g., a fuel slurry 119) in the slurry discharge tank 116 may be discharged to a slurry pump 120. The slurry pump 120 is configured to motivate the fuel slurry 119 at a desired flow rate and deliver the fuel slurry 119 (which may correspond to the fuel slurry 18) to the gasifier 22.

It should be noted that some components and/or features of the feedstock preparation system 14 may be modified, excluded, or additional components may be included. For example, in some embodiments, the grinding mill 102 and the slurry preparation tank 112 may be combined for grinding the solid fuel 12 and mixing the solid fuel 12 with additives (e.g., water) to prepare for the fuel slurry. In certain embodiments, the slurry discharge tank 116 may be removed and the fuel slurry exiting the slurry preparation tank 106 may be directly discharged to the slurry pump 120.

Figure 3:
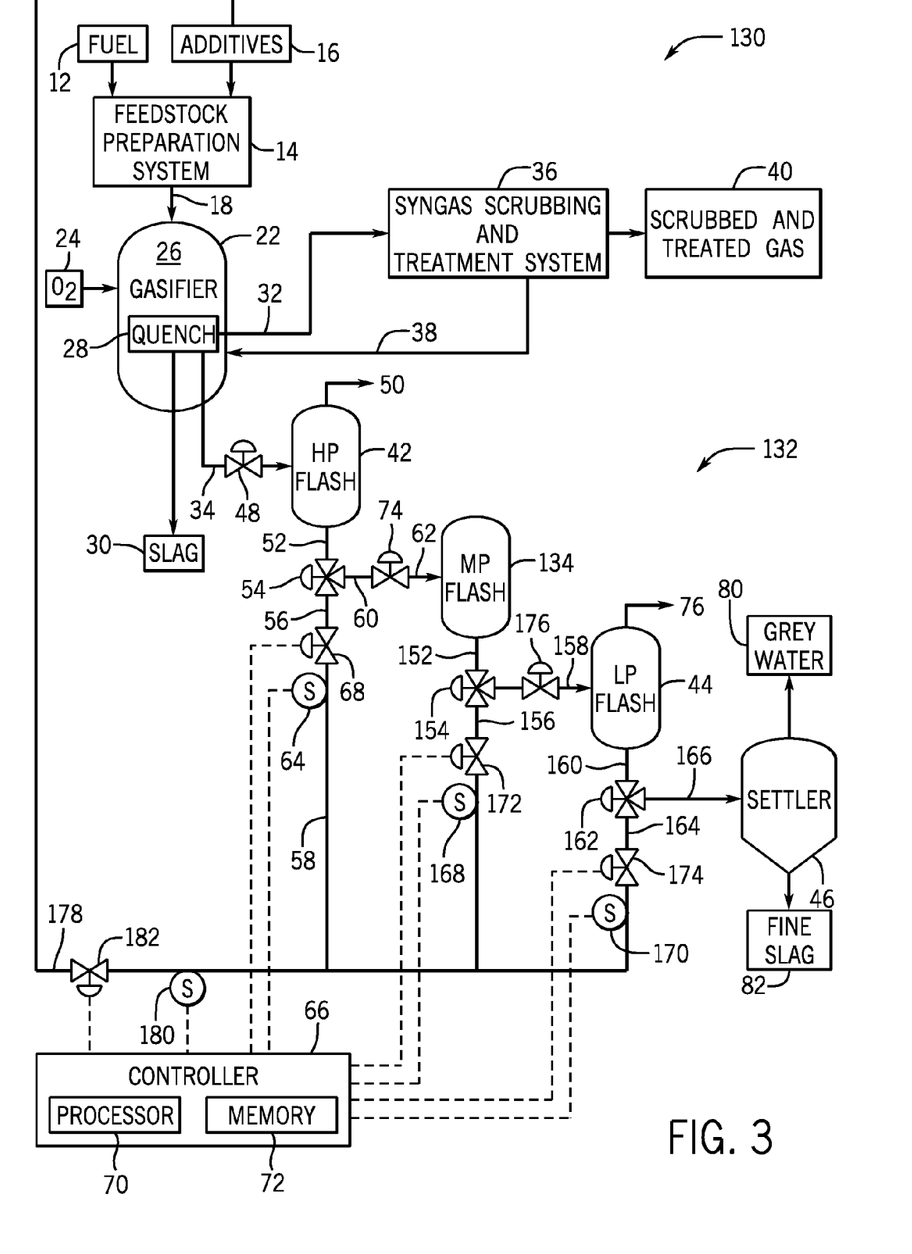
FIG. 3 is a diagrammatical illustration of an embodiment of a gasification system configured to produce syngas and to process black water, the system including a high pressure flash tank, a medium pressure flash tank, and a low pressure flash tank, any one or a combination of which is configured to discharge part of its bottoms water as an additive to mix with a solid fuel in preparing a fuel slurry for the gasification system.

As discussed above, it may be desirable to use a portion of the high pressure flash bottoms (e.g., the first output stream 56 of the first discharged black water 52 from the high pressure flash 42) as water additive for slurry preparation. The present disclosure also provides embodiments where a portion of the black water discharge of other flash tanks may be used to prepare the fuel slurry 18. FIG. 3 illustrates an embodiment of a gasification system 130 with a black water treatment system 132 that includes the high pressure flash tank 42, a medium pressure flash tank 134, and the low pressure flash tank 44. As the gasification system 130 and the black water treatment system 132 illustrated in FIG. 3 include similar or same components as the gasification system 10 and the black water treatment system 20 illustrated in FIG. 1, the components in FIG. 3 will be discussed in a similar context as in FIG. 1 using the same reference numerals for the same elements.

As described above, the fuel slurry 18 may be prepared by mixing the fuel 12 with the additives 16 in the feedstock preparation system 14, and discharged to the gasifier 22. The gasifier 22 may produce the syngas 32, the slag 30, and the black water 34. As shown in FIG. 3, the black water 34, which, in certain embodiments, may include the additional black water 38 produced by the syngas scrubbing and treatment system 36, is provided consecutively to the high pressure flash tank 42, the medium pressure flash tank 134, and the low pressure flash tank 44 for separating fines and gases with water through a progressive reduction in pressure. Any one or a combination of the three flash tanks 42, 134, 44, may discharge a portion of its respective bottom water as water additive to be mixed with the solid fuel 12 in the feedstock preparation system 14.

As shown in FIG. 3, the first discharged black water 52 from the high pressure flash 42 is separated by the three-way valve 54 into two output streams. The first output stream 56 is delivered to the feedstock preparation system 14 via the conduit 58. The second output stream 60 is delivered to the medium pressure flash tank 134 (e.g., via an inlet of the medium pressure flash tank 134) along the conduit 62. The sensor 64 may be coupled to (e.g., located inside, adjacent to, or in flow communication with) the conduit 58 to monitor one or more parameters (e.g., temperature, pressure, flow rate, particles concentration, etc.) of the black water within the conduit 58. The controller 66 may process sensor feedback received from the sensor 64 and may send control signals to the valve 68 located on the conduit 58 based on the sensor feedback to adjust the parameters (e.g., temperature, pressure, flow rate, particles concentration, etc.) of the black water within the conduit 58. The level control valve 74 may be disposed on the conduit 62 to partially control a flow of the black water within the conduit 62 and/or to partially flash the black water within the conduit 62 to produce steam.

Similarly, a second discharged black water 152 discharged from the bottoms of the medium pressure flash 134 (e.g., via an outlet) is separated by a three-way valve 154 into two output streams. A first output stream is delivered to the feedstock preparation system 14 via one or more flow paths (in the illustrated embodiment, a conduit 156), and a second output stream is delivered to the low pressure flash tank 44 (e.g., via an inlet of the low pressure flash tank 44) along one or more flow paths (in the illustrated embodiment, a conduit 158). A third discharged black water 160 discharged from the bottoms of the low pressure flash tank 44 (e.g., via an outlet) is separated by a three-way valve 162 into two output streams. A first output stream is delivered to the feedstock preparation system 14 via one or more flow paths (in the illustrated embodiment, a conduit 164), and a second output stream is delivered to the settler 46 via one or more flow paths (in the illustrated embodiment, a conduit 166).

Sensors 168, 170 may be may be coupled to (e.g., located inside, adjacent to, or in flow communication with) the conduits 156, 164, respectively, to monitor one or more parameters (e.g., temperature, pressure, flow rate, particles concentration, etc.) of the black water contained therein or flowing therethrough. The controller 66 may process sensor feedback received from the sensors 168, 170 and may send control signals to valves 172, 174 located on the conduits 156, 164, respectively, based on the sensor feedback to adjust one or more parameters (e.g., temperature, pressure, flow rate, particles concentration, etc.) of the black water within the conduits 156, 164, respectively. A level control valve 176 may be disposed on the conduit 158 to partially control a flow of the black water within the conduit 158 and/or to partially flash the black water within the conduit 158 to produce steam.

As shown in FIG. 3, the conduits 58, 156, 164 may be combined to one or more flow paths (in the illustrated embodiment, a conduit 178) for delivering the portions of the first, second, and third discharged black water 52, 152, 160 to the feedstock preparation system 14 to be used as water additives for fuel slurry preparation. A sensor 180 may be coupled to (e.g., located inside, adjacent to, or in flow communication with) the conduit 178 to monitor one or more parameters (e.g., temperature, pressure, flow rate, particles concentration, etc.) of the black water within the conduit 178. The controller 66 may process sensor feedback received from the sensor 180 and may send control signals to a valve 182 located on the conduit 178 based on the sensor feedback to adjust the parameters (e.g., temperature, pressure, flow rate, particles concentration, etc.) of the black water within the conduit 178. In some embodiments, each of the conduits 58, 156, 164 may be connected to the feedstock preparation system 14 separately from each without being combined first, or any combination of the conduits 58, 156, 164 may be used. In certain embodiments, the sensor 180 and the valve 182 may be excluded.

According to certain embodiments, high temperature water and/or steam generated by some units (e.g., units other than the flash tanks) integrated into and/or independent of the gasification system (e.g., a boiler, a steam drum, a steam turbine, a heat recovery steam generator (HRSG), a syngas cooler, or any combination thereof) may also be used as water additive to mix with the solid fuel 12 for fuel slurry preparation in addition to the bottoms discharge from the one or more flash tanks.

Figure 4:
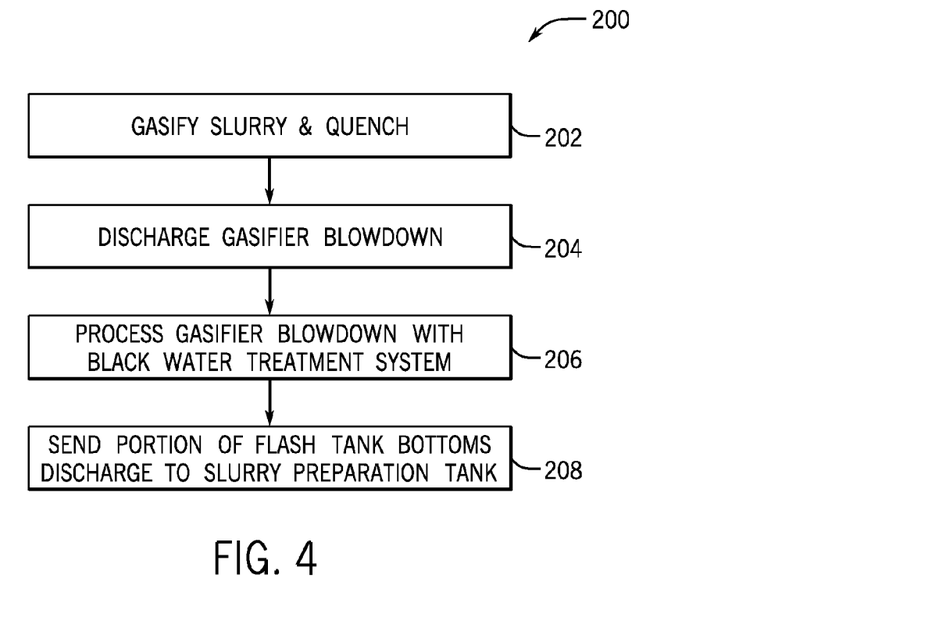
FIG. 4 is a process flow diagram illustrating an embodiment of a method for providing flash bottoms water as a water source for a coal slurry preparation system.

FIG. 4 is a process flow diagram illustrating an embodiment of a method 200 for providing flash bottoms water as a water additive for slurry preparation. As illustrated, the method 200 includes gasifying and quenching (block 202) the fuel slurry 18. For example, the acts represented by block 202 may include providing the fuel slurry 18 to the gasifier 22, where the fuel slurry 18 reacts with oxygen 24 to produce a syngas. The fuel slurry 18 may be prepared by mixing the fuel source 12 with the additive 16. As discussed above, the additive 16 may include any source of hot water, for example boiler feed water or condensate from a shift section of a gas treatment unit (e.g., an acid gas removal unit) integrated with or independent of the gasification system 10, either in addition to or, for example during startup of the gasifier 22, in lieu of a bottoms discharge from one or more flash vessels of the black water treatment system 20. The syngas produced by the gasifier 22 may enter the quench portion 28 where the syngas may be cooled and saturated. The quench portion 28 may produce the slag 30, the partially cooled syngas 32, and the black water 34 that may also be referred to as the gasifier blowdown (block 204).

The black water 34 may be directed to the black water treatment system 20 for processing (block 206). As discussed above with respect to FIGS. 1-3, the black water treatment system 20 may include one or more flash tanks that subject the black water 34 to a series of pressure reductions to remove dissolved gases and to concentrate the fines. The flash bottoms water discharged from the one or more flash tanks (e.g., the first discharged black water 52 from the high pressure flash 42) have a higher temperature compared to ambient temperature, and a portion of this flash bottoms water (e.g., the first output stream 56 of the first discharged black water 52 in FIG. 1) may be delivered to the slurry preparation system 14 to be mixed with the solid fuel 12 to prepare the fuel slurry 18 (block 208), for example in the manner discussed above with respect to FIG. 2.

Figure 5:
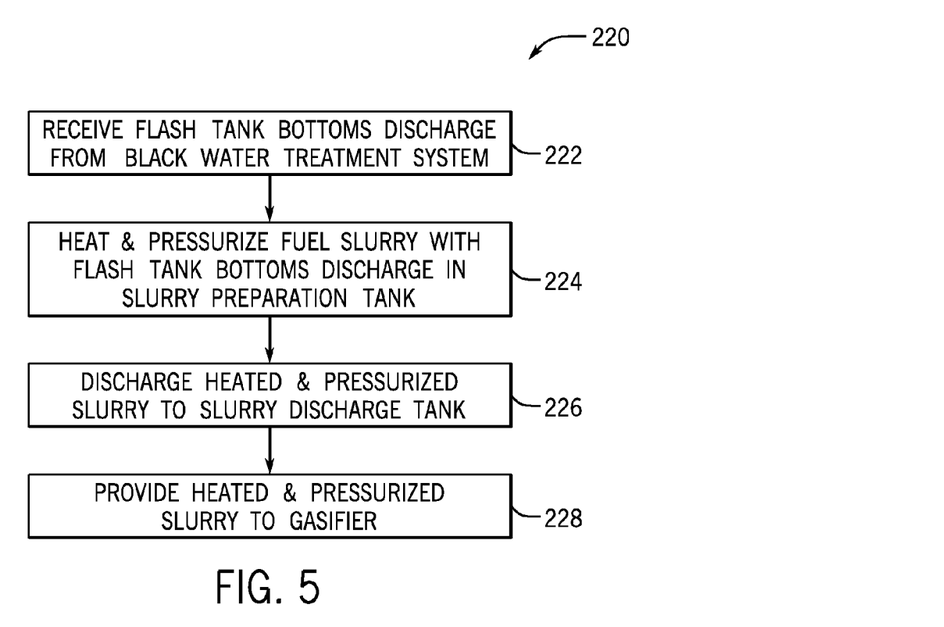
FIG. 5 is a process flow diagram illustrating an embodiment of a method for generating a heated slurry using flash bottoms water as a water source.

FIG. 5 is a process flow diagram illustrating an embodiment of a method 220 for generating a heated slurry by using flash bottoms water as a liquid for slurry preparation. The method 220 includes receiving (block 222) flash bottoms discharge (e.g., the first discharged black water 52 from the high pressure flash 42) from the black water treatment system 20. As noted above, the black water treatment system 20 may include one or more flash tanks that subject the black water 34 to a series of pressure reductions to remove dissolved gases and to concentrate the fines contained within the black water. The flash bottoms water discharged from the one or more flash tanks (e.g., the first discharged black water 52 from the high pressure flash 42) have a higher temperature compared to ambient temperature (or compared to low level steam (e.g., low pressure steam) circulating throughout the system), and a portion of such flash bottoms discharge (e.g., the first output stream 56 of the first discharged black water 52) may be delivered to the slurry preparation system 14 to be mixed with the solid fuel 12 to prepare the fuel slurry 18.

In the slurry preparation tank 106 (FIG. 2), the high temperature flash bottoms discharge (e.g., the first output stream 56 of the first discharged black water 52) is used as a liquid to be mixed with the solid fuel 12 to prepare the fuel slurry 18. The fuel slurry 18 may also be pressurized as appropriate (block 224).

The heated and pressurized fuel slurry 18 is then delivered from the slurry preparation tank 106 to the slurry discharge tank 116 (block 226). The slurry discharge tank 116 is further coupled to the slurry delivery pump 120 to provide the heated and pressurized slurry 18 to the gasifier 22 (block 228).

Technical effects of the subject matter disclosed herein include, but are not limited to, using high temperature water discharged from the one or more flash tanks in the black water treatment system 20 as a liquid to mix with the solid fuel 12 for fuel slurry preparation. While the solid fuel 12 may be mixed with water at ambient temperature (e.g., 25° C.), the present embodiments provide higher temperature water to mix the solid fuel 12 for fuel slurry preparation. Advantageously, the resulting fuel slurry has a higher temperature, thereby decreasing oxygen consumption within the gasifier 22 during the gasification process. Additionally, using high temperature water for fuel slurry preparation may decrease the viscosity of the fuel slurry, thereby promoting the efficiency of the mixing of the solid fuel and the liquid and reducing the power requirement for agitation within the slurry preparation tank. Moreover, using the water that is already present in the gasification system as the additive for mixing with the solid fuel may further reduce the production cost of the syngas.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a gasifier configured to gasify a fuel contained within a fuel slurry comprising at least the fuel and water in order to generate syngas and a black water;
a black water treatment system fluidly coupled to the gasifier, wherein the black water treatment system is configured to treat the black water to generate a grey water, and wherein the black water treatment system comprises:
a first flash tank comprising a first discharge black water outlet, wherein the first flash tank is configured to process the black water by reducing a pressure of the black water to generate a first discharged black water;
a second flash tank comprising a black water inlet fluidly coupled to the first discharge black water outlet;
a first conduit upstream of the second flash tank and extending from the first discharged black water outlet of the first flash tank to a feedstock preparation system configured to generate the fuel slurry, wherein the first conduit fluidly couples the first discharge black water outlet and the feedstock preparation system and flows a first portion of the first discharged black water of the first flash tank to the feedstock preparation system; and
a second conduit disposed between and fluidly coupling the first discharge black water outlet of the first flash tank and the black water inlet of the second flash tank, wherein the second conduit extends from the first conduit.

2. The system of claim 1, wherein the feedstock preparation system comprises a fuel slurry preparation tank fluidly coupled to an outlet of the first conduit and configured to receive the first portion of the first discharged black water and the fuel in order to generate the fuel slurry.

3. The system of claim 1, wherein the second flash tank is configured to receive a second portion of the first discharged black water of the first flash tank through the black water inlet via the second conduit, and to process the second portion of the first discharged black water by reducing a pressure of the second portion of the first discharged black water to generate a second discharged black water from the second portion of the first discharged black water.

4. The system of claim 3, wherein a second discharged black water outlet of the second flash tank is fluidly coupled to the feedstock preparation system via the first conduit, and an additional conduit extending from the second discharged black water outlet to the first conduit, or a combination thereof.

5. The system of claim 3, comprising one or more flow control devices positioned along the first conduit, the second conduit, or both, wherein the one or more flow control devices are capable of adjusting the relative amounts of the first and second portions of the first discharged black water.

6. The system of claim 1, wherein the first flash tank is a high pressure flash tank in the black water treatment system operating at between approximately 20 barg and 7 barg.

7. The system of claim 1, wherein the first discharged black water has a temperature of between approximately 150° C. and 210° C.

8. The system of claim 1, wherein the black water processing system comprises the first flash tank, the second flash tank, and one or more additional flash tanks, and wherein the feedstock preparation system is fluidly coupled to respective discharged black water outlets of the first flash tank and any one or a combination of the second flash tank and the one or more additional flash tanks via at least the first flow path conduit and additional conduits coupling the respective discharged black water outlets with the first conduit.

9. The system of claim 1, wherein the first discharge black water outlet of the first flash tank is disposed on a first end of the first flash tank, and the first flash tank comprises a vapor discharge outlet positioned on a second end of the first flash tank that is substantially opposite the first end.

10. A method, comprising:
providing a discharged black water generated by a gasifier to a feedstock preparation system from a first flash tank of a black water processing system via a first conduit extending from and fluidly coupling a black water discharge outlet of the first flash tank to the feedstock preparation system,
generating the fuel slurry using at least the discharged black water and a solid fuel; and
providing at least a portion of the discharge black water from the first flash tank to a second flash tank via a second conduit disposed between and fluidly coupling the black water discharge outlet of the first flash tank and a black water inlet of the second flash tank, wherein the second conduit extends from the first conduit;
controlling a first flow of the discharge black water from the first flash tank to the feedstock preparation system and a second flow of the portion of the discharge black water from the first flash tank to the second flash tank using a controller comprising one or more tangible, non-transitory, machine-readable media collectively storing one or more sets of instructions, and one or more processing devices configured to execute the one or more sets of instructions to control the first and second flows of the discharge black water through the first and second conduits, respectively.

11. The method of claim 10, wherein generating the fuel slurry comprises using a fuel slurry preparation tank to mix the discharged black water with the solid fuel.

12. The method of claim 10, comprising:
generating a syngas and the black water via gasification of the fuel slurry in the gasifier; and
treating the black water to generate a grey water using the black water treatment system, wherein treating the black water comprises reducing a pressure of the black water to generate the discharged black water using the first flash, the second flash tank, or a combination thereof.

13. The method of claim 12, wherein reducing the pressure of the black water comprises reducing the pressure of the black water using the first flash tank or the second flash tank operating at a higher pressure compared to at least one other flash tank of the black water treatment system.

14. The method of claim 12, wherein using the first flash tank or the second flash tank comprises using a high pressure flash tank operating at a pressure of between approximately 20 barg and 7 barg.

15. The method of claim 12, wherein reducing the pressure of the black water to generate the discharged black water comprises generating the discharged black water at a temperature of between approximately 150° C. and 210° C.

16. A system, comprising:
a controller, comprising:
one or more tangible, non-transitory, machine-readable media collectively storing one or more sets of instructions; and
one or more processing devices configured to execute the one or more sets of instructions to:
control a flow of a first portion of discharged black water from at least one flash tank of a black water processing system and to a feedstock preparation system of a gasification system via first conduit extending between and fluidly coupling a black water discharge outlet of at least the one flash tank and the feedstock preparation system;
control the operation of the feedstock preparation system to receive at least the discharged black water and a solid fuel to generate a fuel slurry; and
control a flow of a second portion of the discharge black water from the at least one flash tank to an additional flash tank via a second conduit disposed between and fluidly coupling the black water discharge outlet of the at least one flash tank and a black water inlet of the additional flash tank, wherein the second conduit extends from the first conduit.

17. The system of claim 16, wherein the one or more processing devices are configured to execute the one or more sets of instructions to:
control a rate of addition of at least the first portion of the discharged black water and the solid fuel into a fuel slurry preparation tank; and
control a rate of mixing of the first portion of the discharged black water and the fuel slurry in the fuel slurry preparation tank.

18. The system of claim 17, wherein the one or more processing devices are configured to execute the one or more sets of instructions to control the rate of addition of the solid fuel into the fuel slurry preparation tank by intermittently signaling a first feed hopper and a second feed hopper to add the solid fuel into the fuel slurry preparation tank.

19. They system of claim 16, wherein the one or more processing devices are configured to execute the one or more sets of instructions to:
   control a gasifier to generate a syngas from partial oxidation of the fuel slurry and an oxidant, and to generate a black water; and
   control the black water treatment system to treat the black water to generate a grey water and the first portion of the discharged black water.

20. The system of claim 16, wherein the one or more processing devices are configured to execute the one or more sets of instructions to control the flow of the first portion of the discharged black water from a high pressure flash tank operating at a pressure of between approximately 20 barg and 7 barg.

\* \* \* \* \*